(12) United States Patent
Andersen

(10) Patent No.: US 11,517,409 B2
(45) Date of Patent: Dec. 6, 2022

(54) DENTAL IMPLANT ANALOG

(71) Applicant: ELOS MEDTECH PINOL A/S, Gørløse (DK)

(72) Inventor: Henrik Andersen, Skibby (DK)

(73) Assignee: Elos Medtech Pinol A/S

( * ) Notice: Subject to any disclaimer, the term of this patent is extended or adjusted under 35 U.S.C. 154(b) by 0 days.

(21) Appl. No.: 16/954,760

(22) PCT Filed: Dec. 21, 2018

(86) PCT No.: PCT/EP2018/086641
§ 371 (c)(1),
(2) Date: Jun. 17, 2020

(87) PCT Pub. No.: WO2019/122354
PCT Pub. Date: Jun. 27, 2019

(65) Prior Publication Data
US 2020/0375708 A1    Dec. 3, 2020

(30) Foreign Application Priority Data
Dec. 22, 2017 (EP) .................................. 17210284

(51) Int. Cl.
*A61C 13/34* (2006.01)
*A61C 8/00* (2006.01)

(52) U.S. Cl.
CPC ............ *A61C 13/34* (2013.01); *A61C 8/0024* (2013.01); *A61C 8/0037* (2013.01); *A61C 8/0068* (2013.01); *A61C 8/0089* (2013.01); *A61C 8/0093* (2013.01)

(58) Field of Classification Search
CPC ..... A61C 13/34; A61C 8/0024; A61C 8/0037; A61C 8/08; A61C 8/0068; A61C 8/0089; A61C 8/0093; A61C 8/0001; A61C 8/00; A61C 8/0022; A61C 8/0039; A61C 8/008; A61C 2008/0046; A61C 2008/0084
USPC .......................................... 433/213
See application file for complete search history.

(56) References Cited

U.S. PATENT DOCUMENTS

| | | | |
|---|---|---|---|
| 2,042,200 A * | 5/1936 | Torp ...................... | A61C 9/002 433/213 |
| 6,283,752 B1 * | 9/2001 | Kumar ................. | A61C 8/0001 433/172 |
| 2006/0121416 A1 * | 6/2006 | Engman ............... | A61C 8/0001 433/173 |
| 2008/0032263 A1 * | 2/2008 | Bondar .................. | A61C 8/005 433/173 |
| 2008/0243123 A1 * | 10/2008 | Gordils Wallis ... | A61B 17/1695 606/80 |
| 2009/0130630 A1 * | 5/2009 | Suttin .................... | A61C 8/009 433/174 |
| 2009/0325125 A1 * | 12/2009 | DiAngelo .......... | A61C 13/0004 433/173 |

(Continued)

FOREIGN PATENT DOCUMENTS

EP        3009100 A1    4/2016

*Primary Examiner* — Matthew M Nelson
(74) *Attorney, Agent, or Firm* — BakerHostetler

(57) ABSTRACT

The present invention relates to a dental implant analog, an implant analog kit comprising the dental implant analog, the combination of a physical model of a set of a patient's teeth and the dental implant analog and a method of positioning a dental implant analog into a physical model of a set of a patient's teeth.

17 Claims, 7 Drawing Sheets

(56) References Cited

U.S. PATENT DOCUMENTS

| | | | | |
|---|---|---|---|---|
| 2010/0092921 A1* | 4/2010 | Huffman | ................ | A61C 13/12 |
| | | | | 433/213 |
| 2010/0248180 A1* | 9/2010 | Bondar | ................ | A61C 8/0001 |
| | | | | 433/141 |
| 2012/0135380 A1* | 5/2012 | Palti | .................... | A61C 8/0001 |
| | | | | 433/213 |
| 2013/0289950 A1* | 10/2013 | Kopelman | ......... | A61C 13/0004 |
| | | | | 703/1 |
| 2015/0030993 A1* | 1/2015 | von Malottki | ....... | A61C 8/0001 |
| | | | | 433/173 |
| 2016/0128813 A1* | 5/2016 | Scharfe Thomsen | ........................ | |
| | | | | A61C 13/0019 |
| | | | | 433/213 |
| 2016/0250008 A1* | 9/2016 | Brun | ................. | A61C 13/0019 |
| | | | | 433/213 |
| 2020/0107916 A1* | 4/2020 | Senn | ....................... | B33Y 80/00 |
| 2020/0375708 A1* | 12/2020 | Andersen | ............. | A61C 8/0024 |

* cited by examiner

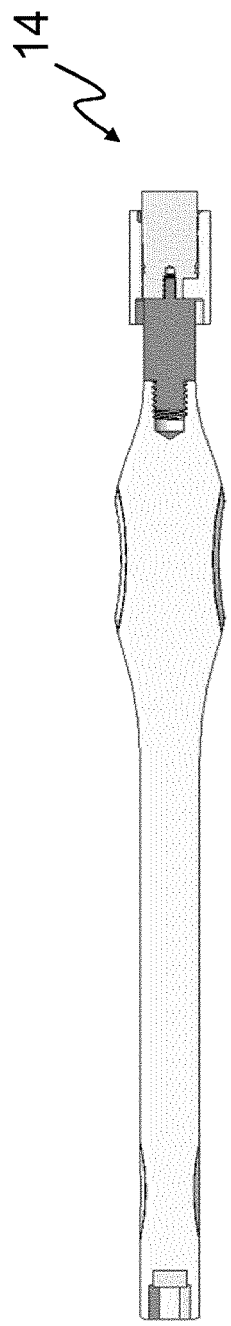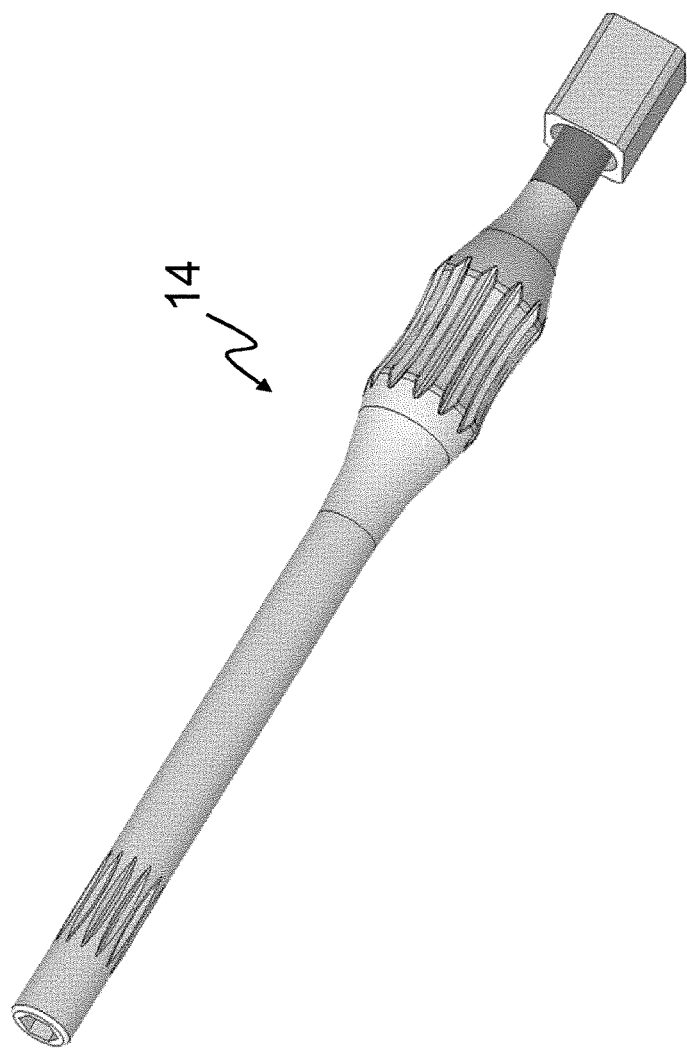

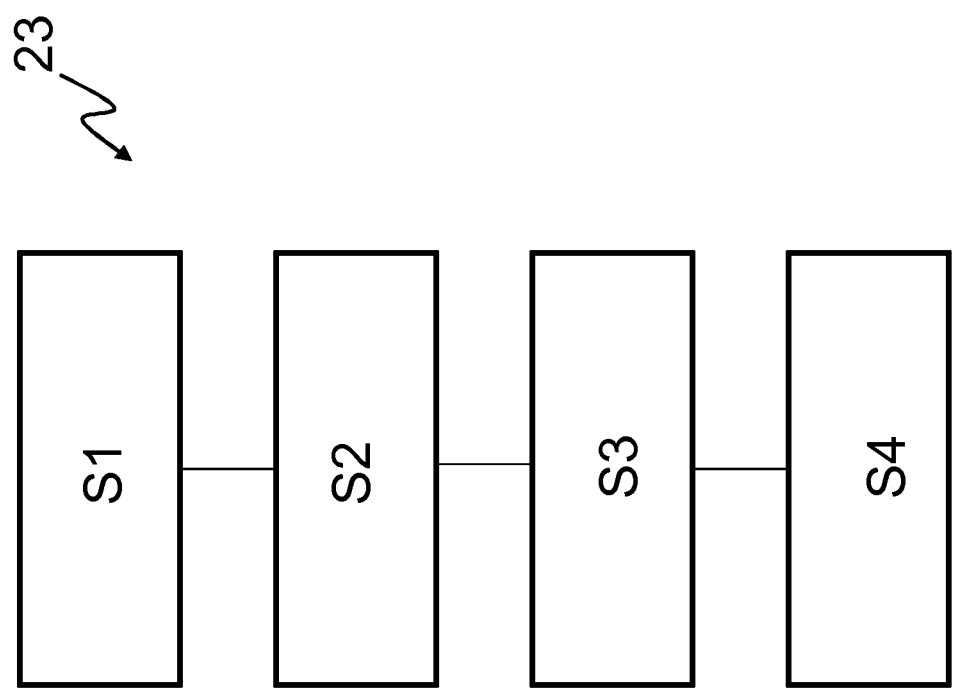

DENTAL IMPLANT ANALOG

CROSS-REFERENCE TO RELATED APPLICATIONS

This application is the National Stage of International Patent Application No. PCT/EP2018/086641, "A Dental Implant Analog" (filed Dec. 21, 2018), which claims priority from EP Patent Application No. 17210284.0, "A Dental Implant Analog" (filed Dec. 22, 2017). The foregoing applications are incorporated herein by reference in their entireties for any and all purposes.

FIELD OF THE INVENTION

The present invention relates to a dental implant analog, an implant analog kit comprising the dental implant analog, the combination of a physical model of a set of a patient's teeth and the dental implant analog and a method of positioning a dental implant analog into a physical model of a set of a patient's teeth.

BACKGROUND OF THE INVENTION

Physical model of a set of a patient's teeth requires very low engineering tolerance, i.e. permissible limit or limits of variation between the designed values and the actual value of the different physical dimension of a physical model.

Compliance to these levels of tolerance is not always achieved as low cost printing machinery, such as low cost additive manufacturing, may produce physical models having physical dimensions deviating substantially from the designed dimension.

This has the disadvantage that tight fit between implant analog and correspondent physical model might not be achievable or might be achieved by substantial deformation of the dimensions and the shape of the though-going holes within the physical model. In turns, the application of high pressure and correspondent deformation of the physical model may cause incorrect placement of the implant and thus incorrect positioning of the implant analog with immediate consequences on the tooth restoration process.

Hence, there is the need of an implant analog ensuring tight fit also with physical model of patient's teeth showing slightly incorrect dimension.

OBJECT OF THE INVENTION

It may be seen as an object of the present invention to provide an implant analog that can be correctly positioned despite slightly incorrect dimension of the with physical model of patient's teeth.

It may be seen an object of the present invention to wholly or partly overcome the above disadvantages and drawbacks of the prior art.

An object of the present invention may also be to provide an alternative to the prior art.

SUMMARY OF THE INVENTION

Thus, the above described object and several other objects are intended to be obtained in a first aspect of the invention by providing a dental implant analog with an elongated cylindrical body, comprising: a first and a second opposite surfaces, wherein the first surface is, when in use, a reference surface for active alignment of the implant analog with one or more surfaces of a physical model of patient's teeth.

The use an external reference surface in order to align the implant analog provides better accessibility and visibility of the surface and avoids potential hindrance occurring at an internal surface.

Active alignment is defined as an alignment produced by direct actions such as pulling, pushing or screwing.

Alignment is achieved when the first surface is flush with the one or more surfaces of a physical model of patient's teeth.

In some embodiments, the implant analog is inserted in a through-going hole of the physical model of a set of a patient's teeth and the one or more surfaces of a physical model of patient's teeth surround the through-going hole.

The active alignment may occur with the one or more surfaces surrounding the through-going hole of the physical model of a set of a patient's teeth.

In some further embodiments, when in use, the implant analog is inserted in the through-going hole first surface first.

The first surface, being the reference surface, when in use, is the surface that is inserted firstly, i.e. before any others surface or before anything else is inserted in the through-going hole. Indeed, the first surface, being the reference surface, is the first along the direction of insertion into the through-going hole.

In some embodiments, the dental implant analog further comprises: a distal end; a proximal end; and a central or middle section in between the distal and proximal end. In some further embodiments, the proximal end comprises at least one internal bore along the longitudinal axis of the implant analog, the at least one internal bore having an internal thread.

In some further embodiments, the distal end may comprise the first surface and the proximal end may comprise the second opposite surface.

In some other embodiments, the distal end comprises the second surface and the proximal end comprises the first surface.

The second surface is opposite as it may be located at the opposite end of the elongated dental implant analog.

In some embodiments, that dental implant analog further comprises: anti-rotational means and/or guiding means and/or cutting means.

The anti-rotational means may comprise protrusions and/or recesses, surrounding the at least one internal bore having the internal thread, engaging, when in use, with one or more complementary or correspondent recesses and/or protrusions located in the through-going hole of the physical model of a set of a patient's teeth, i.e. on the internal surfaces of the through-going hole. The presence of the anti-rotational means avoids undesired rotation of the dental implant analog in the physical model of a set of a patient's teeth.

In some embodiments, the anti-rotational means are two opposite recesses, i.e. two recesses located in opposite position in respect to the central axis of the analog impeding undesired sideways movement of the implant analog when in use.

The anti-rotational means may be located in the proximal end, i.e. the proximal end may comprise the anti-rotational means.

The anti-rotational means may comprise the guiding means.

The anti-rotational means may also have the function of centring and thus correctly guiding the implant analog into the through-going hole of the physical model of a set of a patient's teeth.

In some embodiments, the proximal end further comprises the guiding means.

The guiding mean may be one recess on the proximal end of the implant analog mating with a complementary protrusion on the physical model, providing correct direction of insertion as only one direction of insertion is possible in which recess and protrusion can mate.

The recess has a guiding function and provide directionality of the insertion as it can only be inserted in one specific direction, as only one protrusion in the physical model is complementary with the recess on the implant analog.

The guiding means may also be located in other part of the implant analog.

In some embodiments, the guiding means are located in the middle section, i.e. the middle section comprises the guiding means.

In some embodiments, the guiding means comprise annular lip engaging, when in use, with one or more complementary protrusions located in the through-going hole of a physical model of a set of a patient's teeth, i.e. on its internal surfaces, thereby providing a snap-fit with the one or more complementary protrusions.

The engagement between the annular lip and the one or more complementary protrusions avoids undesired removal of the implant as fastening the implant in the correct position.

The annular lip may comprises a circular lip surrounding the at least one internal bore having the internal thread along said longitudinal axis.

The annular lip may comprises triangular shape elements having an inclined top engaging surface, such as a wedge or wedge lip.

When in use, the inclined top surface may engage with the one or more complementary protrusions located on the through-going hole of the physical model of a set of a patient's teeth, in a snap-fit fashion.

The cutting means may be located in different part of the implant analog.

In some embodiments, the proximal end further comprises cutting means.

In some other embodiments, the middle section comprises cutting means.

In some further embodiments, the distal end comprises cutting means.

The presence of cutting means ensures centring and tight fit within the through-going hole of a physical model of a set of a patient's teeth, by removing, such as by cutting or scraping excessive material present on the surface of the correspondent protrusions of the physical model.

This provide tight fit between the implant and the physical model having physical dimensions substantially deviating from the designed dimension.

This also allows for pulling the implant in place without applying excessive pressure to the physical model, which may cause deformation of the physical model.

The cutting means may remove, when in use, redundant material present on an internal surface of the through-going hole of a physical model of a set of a patient's teeth, thereby ensuring tight fit between the implant analog and the through-going hole of the physical model of a set of a patient's teeth.

Redundant material is material that is excessive in relation to the tight fit between implant and physical model.

The cutting means may be cutting edges.

The cutting edges are edge surfaces having a cutting function.

The cutting edges are sharp edges having a cutting function, i.e. ensuring tight fit of the implant analog within physical models having low tolerance without applying excessive pressure to the physical model, which may cause deformation of the physical model.

Thus in one aspect the invention relates to a dental implant analog with an elongated cylindrical body, comprising: a first and a second opposite surfaces, wherein the first surface is, when in use, a reference surface for active alignment of the implant analog with one or more surfaces of a physical model of patient's teeth, and wherein the implant analog is, when in use, inserted by pulling or by pushing in a through-going hole of the physical model of a set of a patient's teeth and the one or more surfaces of a physical model of patient's teeth surround the through-going hole; the dental implant analog further comprising: a distal end; a proximal end; and a central or middle section in between the distal and proximal end; the proximal end comprising cutting means; wherein the cutting means remove by scraping, when in use, redundant material present on an internal surface of the through-going hole of a physical model of a set of a patient's teeth, thereby ensuring tight fit between the implant analog and the through-going hole of the physical model of a set of a patient's teeth; wherein the cutting means are cutting edges.

In that, cutting means and cutting edges are not self-tapping threads but cutting edges removing by scraping redundant material on the internal surface of the through-going hole of a physical model of a set of a patient's teeth, when the implant analog is inserted by pulling or pushing in the through-going hole.

In some embodiments, the implant analog comprises in its proximal end two opposite recesses having an anti-rotational function. The two opposite recesses may comprise each a sharp cutting edge. The implant analog may further comprise a further recess mating with a complementary protrusion on the physical model, providing correct direction of insertion, thus having guiding function. Together with the two opposite recesses, this third recess provides balancing of the anti-rotational effect and centring of the implant analog in the physical model. The two opposite recesses also comprise each cutting elements, such as cutting edges that, when in use, during the insertion of the implant analog into the though-going hole of the physical model remove by cutting and/or scraping excessive material present on the internal surface of the though-going hole of the physical model on the surface of the complementary two opposite protrusions in the through-going hole of the physical model.

In another aspect, the invention relates to a dental implant analog with an elongated cylindrical body, comprising: a distal end; a proximal end; and a central or middle section in between the distal and proximal end; wherein the proximal end comprises at least one internal bore along the longitudinal axis of the analog, the at least one internal bore having an internal thread; and wherein the implant analog further comprises: anti-rotational means; guiding means; and cutting means.

In a second aspect, the invention relates to an implant analog kit comprising: the dental implant analog according to the first aspect; and an element having a first end and a second end, wherein the first end has an external thread configured to engage with the internal thread of the at least one internal bore.

In some embodiments, the element is a tightening tool, thereby pulling into place said dental implant analog while said first end engage with the internal thread of the at least one internal bore.

In some further embodiments, the element is an elongated element such as an elongated pin having an engaging surface located onto the second end adapted to engage with a pulling or a pushing tool.

A pulling tool, or puller, is a tool having the function of pulling the elongated pin, when engaged with the dental implant analog, thus pulling the dental implant analog into place.

In some further embodiments, the element is a screw and the second end comprises an engaging surface adapted to mate with protuberance or recesses of a tightening tool.

In a third aspect, the invention relates to the combination of a physical model of a set of a patient's teeth and a dental implant analog according to first aspect of the invention, the physical model of a set of a patient's teeth having a base face and an opposite gingival part and a through-going hole extending from the base face to said opposite gingival part, wherein the through-going hole comprises one or more recesses and/or protrusions engaging with complementary protrusions and/or recesses surrounding the at least one internal bore.

In some embodiments, the one or more protrusions located in a through-going hole of a physical model of a set of a patient's teeth comprises one or more wedge elements.

In some further embodiments the one or more protrusions located in a through-going hole of a physical model of a set of a patient's teeth are one or more indentations within an internal surface of the through-going hole.

The one or more indentation may be a groove within the internal surface of the through-going hole.

A groove is a long and narrow indentation built into the internal surface of the through-going hole In a fourth aspect, the invention relates to a method of positioning a dental implant analog into a physical model of a set of a patient's teeth using the implant analog kit according to second aspect of the invention, the method comprising: inserting the dental implant analog according to the first aspect of the invention through a gingival face of a thorough-going hole extending from a base face to the opposite gingival face of the physical model of a set of a patient's teeth; inserting the first end of the element through the base face of the through-going hole extending from the base face to the opposite gingival face; engaging the external thread of the first end of the element with the internal thread of the at least one internal bore; pulling, pushing or screwing the dental implant analog into place until contact between an end surface of the element or of the pulling tool or of the pushing tool and the first surface, such as a bottom surface, of the implant analog, thereby aligning the end surface and the bottom surface with the one or more surfaces of a physical model of patient's teeth surrounding the through-going hole, such as the base face of the physical model.

The positioning of the analog is thus defined by the contact between the analog surface and the correspondence surface of the pulling, pushing or tightening tool when aligned with the appropriate external surface of the physical model of patient's teeth.

Contact is referred to as surface-to-surface contact.

The contact between the end surface of the element or of the pulling tool or of the pushing tool and the first surface of the implant analog occurs when the first surface is aligned with the correspondent one or more surfaces of a physical model of patient's teeth surrounding the through-going hole, thus for example, when the bottom surface of the analog is flush with the base face of the physical model.

The first, second and other aspects and embodiments of the present invention may each be combined with any of the other aspects or embodiments. These and other aspects or embodiments of the invention will be apparent from and elucidated with reference to the embodiments described hereinafter.

BRIEF DESCRIPTION OF THE FIGURES

The dental implant analog, an implant analog kit comprising the dental implant analog, the combination of a physical model of a set of a patient's teeth and the dental implant analog and a method of positioning a dental implant analog into a physical model of a set of a patient's teeth according to the invention will now be described in more detail with regard to the accompanying figures. The figures show one way of implementing the present invention and is not to be construed as being limiting to other possible embodiments falling within the scope of the attached claim set.

FIGS. 6A and 6B show a cross section and a 3D representation of the element engaging with the implant analog when the element is a tightening tool.

FIG. 8 is a flow-chart of a method according to one aspect of the invention.

DETAILED DESCRIPTION OF AN EMBODIMENT

Figure 1:
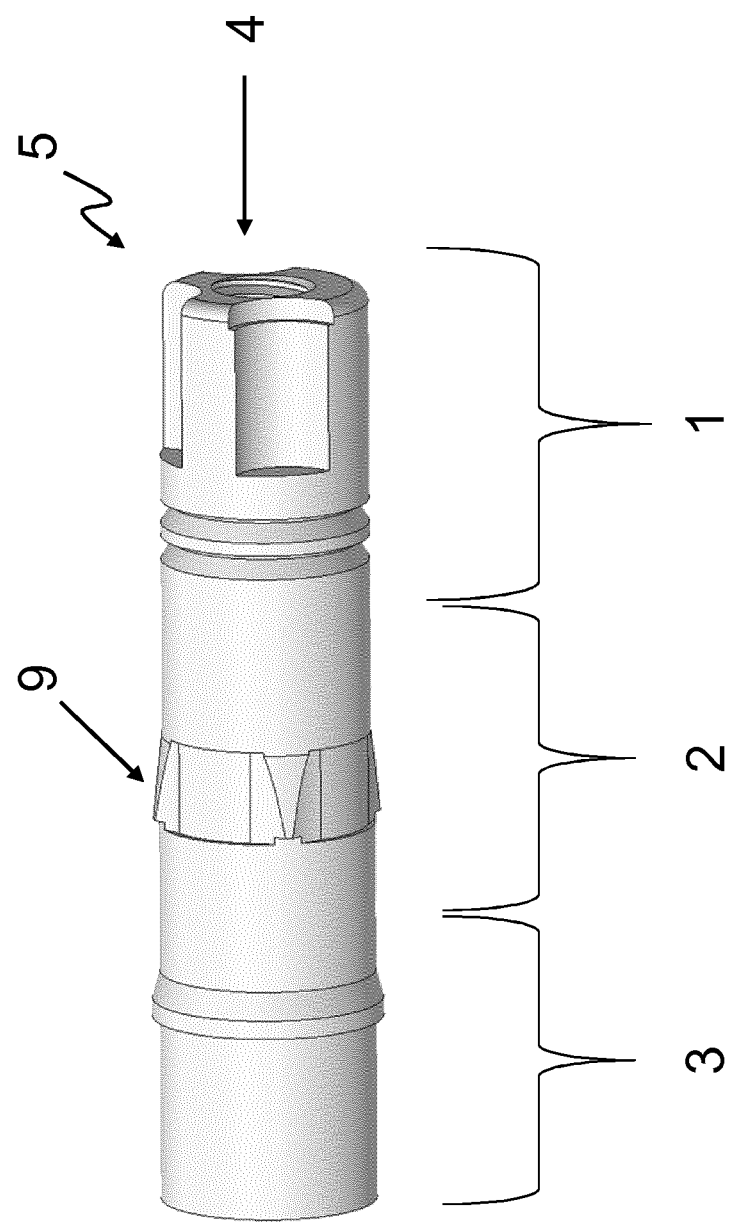
FIG. 1 shows a 3D representation of an implant analog according to some embodiments of the invention.
Figure 2:
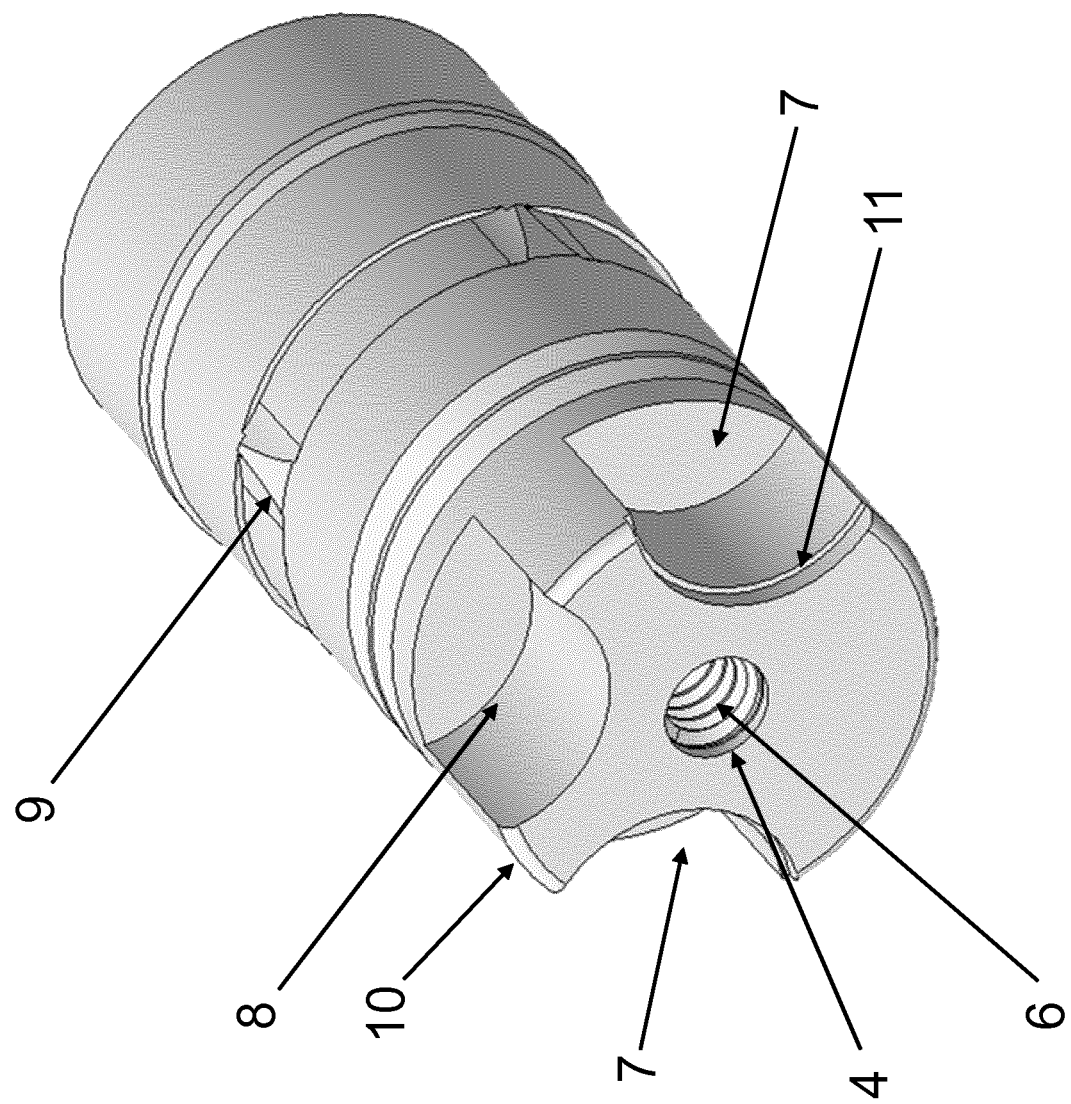
FIG. 2 shows a 3D representation of an implant analog according to some other embodiments of the invention.

FIG. 1 and FIG. 2 show a 3D representation of an implant analog 5 comprising a proximal end 1 a middle section 2 and a distal end 3.

The implant analog is characterized by an internal bore 4 along the longitudinal axis of the analog. In this embodiment, the analog has an annular lip 9 in the middle section, comprising triangular wedges having an inclined top surface.

The proximal end 1 comprises one recess 8 having guiding function and two opposite recesses 7 having anti-rotational function. The two opposite recess 7 comprise each a sharp cutting edge 11.

The internal bore 4 has an internal thread 6.

The implant analog 5 have also further guiding means such as bevelled edges 10.

Figures 3A, 3B:
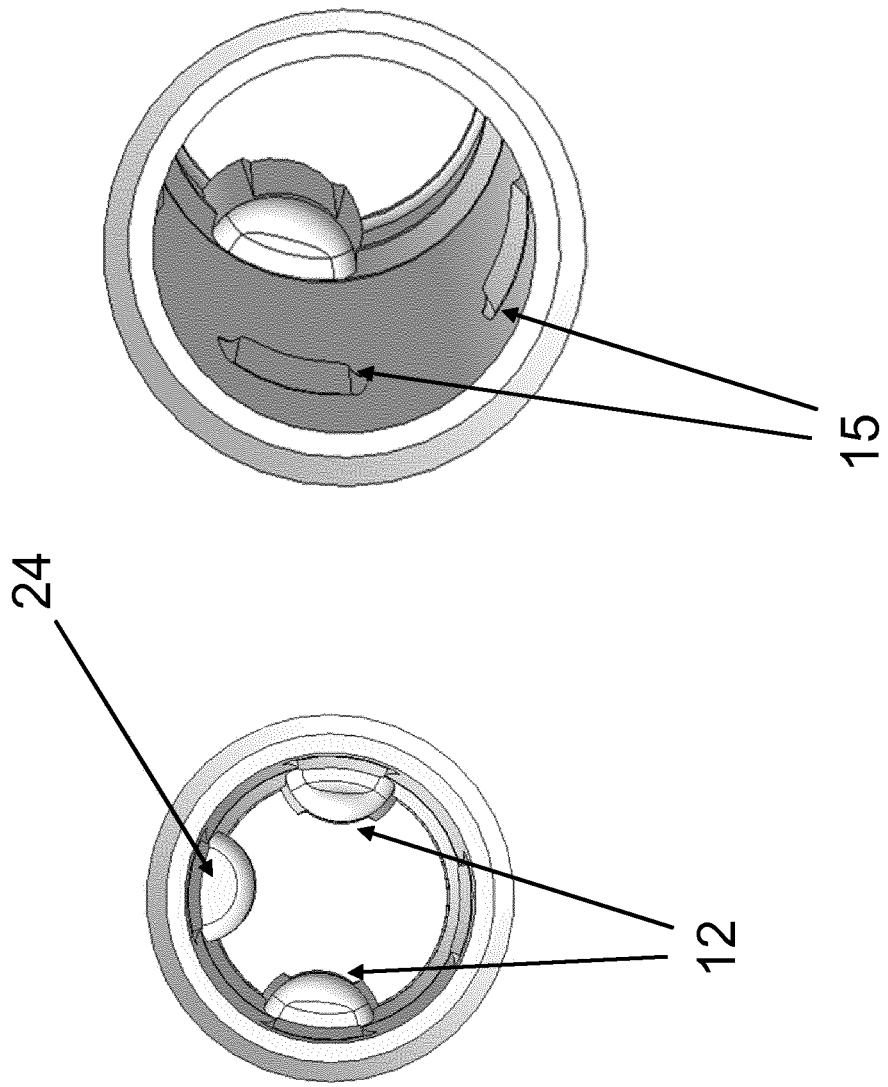
FIGS. 3A and 3B show 3D representations of through-going holes within physical models of patient's teeth, according to some embodiments of the invention.

FIGS. 3A and 3B show 3D representations of through-going holes within physical models of patient's teeth having protrusions 15 and protrusion 12.

When the implant analog is inserted in the through-going hole, the triangular wedges of the annular lip 9 engage with the complementary protrusions 15 located on the internal surface of the through-going hole in a snap-fit fashion fastening the analog to the hole.

The two protrusion 12 are complementary to the recesses 7, thereby avoiding undesired rotation of the analog inserted into the hole of the physical model. The sharp cutting edges 11 remove, while the analog is inserted, redundant material ensuring tight fit.

Recess 8 complementary to protrusion 24 ensures correct directionality of the insertion.

Figure 4:
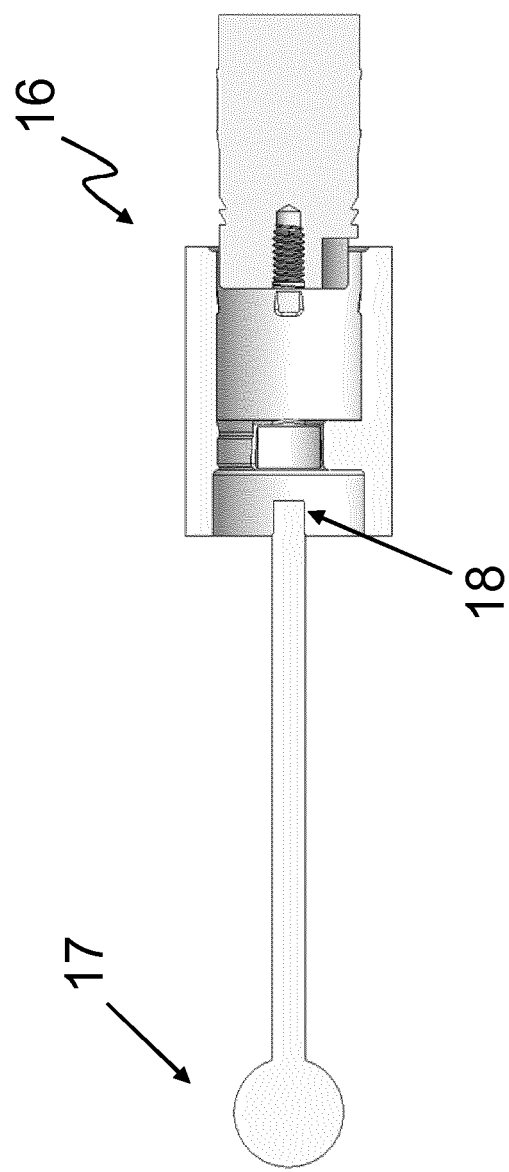
FIG. 4 shows a cross section of the elongated pin entering the through-going hole of the physical model to engage with the implant analog according to some embodiments of the invention.

FIG. 4 shows a cross section of the elongated pin 17 entering the through-going hole of the physical model 16 to engage with the implant analog. The elongated pin 17 has an external threaded end engaging with the internal threaded end od the internal bore of the implant analog.

Figure 5:
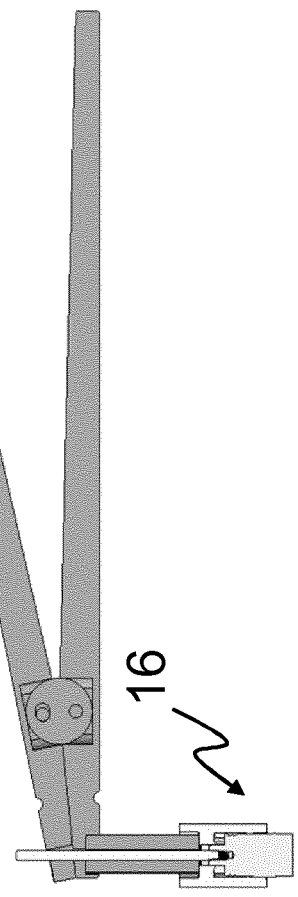
FIG. 5 shows a cross section of a pulling tool engaging with the elongated pin fastened to the implant analog, thus pulling the implant analog into place inside the through-going hole of the physical model.

Once engaged as shown in FIG. 5, the implant analog is put into place into the physical model 16 by pulling tool 19.

FIGS. 6A and 6B show an embodiment in which the element engaging with the implant analog is the tightening tool 14. In this embodiment, the implant analog is correctly pulled into place by tightening the tool 14.

Figure 7B:
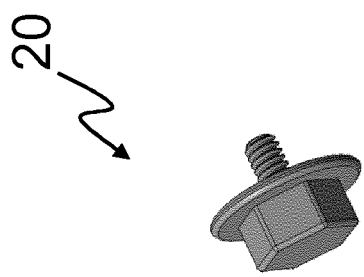
FIGS. 7A and 7B show a cross section and a 3D representation of the element being a screw engaged to the implant analog and alone respectively.
Figure 7A:
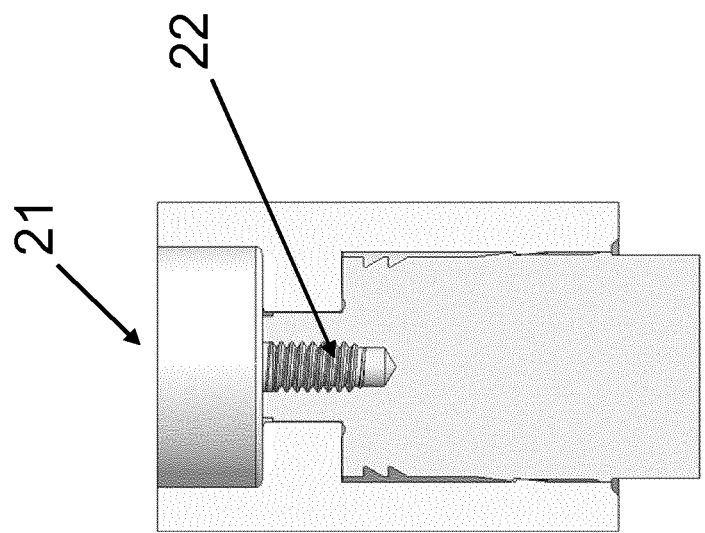

FIGS. 7A and 7B show an embodiment in which the element engaging with the implant analog is a screw 20.

The screw 20 has an external thread 22 engaging with the internal thread of the bore of the implant analog. The screw 20 has also a second end comprising an engaging surface 21 adapted to mate with protuberance or recesses of a tightening tool.

FIG. 8 is a flow-chart of a method 23 of positioning a dental implant analog into a physical model of a set of a patient's teeth using the implant analog kit according to second aspect of the invention.

The method 23 comprises: S1 inserting the dental implant analog according to the first aspect of the invention through a gingival face of a thorough-going hole extending from a base face to the opposite gingival face of the physical model of a set of a patient's teeth; S2 inserting the first end of the element through the base face of the through-going hole extending from the base face to the opposite gingival face; S3 engaging the external thread of the first end of the element with the internal thread of the at least one internal bore; S4 pulling, pushing or screwing the dental implant analog into place until contact between an end surface of the element or of the pulling tool or of the pushing tool and the first surface, such as a bottom surface, of the implant analog, thereby aligning the end surface and the bottom surface with the one or more surfaces of a physical model of patient's teeth surrounding the through-going hole, such as the base face of the physical model.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A dental implant analog (5) with an elongated cylindrical body having a longitudinal axis, comprising: a first and a second opposite surfaces, wherein said first surface is, when in use, a reference surface for active alignment of said dental implant analog with one or more surfaces of a physical model of patient's teeth, and wherein said dental implant analog is configured to be inserted by pulling via a pulling tool in a through-going hole of said physical model of a set of a patient's teeth and said one or more surfaces of a physical model of patient's teeth surround said through-going hole, wherein said dental implant analog is configured to be inserted in said through-going hole first surface first; the dental implant analog further comprising:
a distal end (3);
a proximal end (1), wherein said proximal end further comprises at least one internal bore (4) along the longitudinal axis of said dental implant analog, said at least one internal bore having an internal thread; and
a middle section (2) in between said distal end and said proximal end;
said proximal end comprising a first anti-rotational recess extending from the proximal end along the dental implant analog in the direction of the distal end, the first anti-rotational recess being configured to engage with a complementary feature of the through-going hole of the physical model of the set of the patient's teeth so as to resist rotation of the dental implant analog and the first anti-rotational recess comprising a cutting edge configured to remove, by scraping, redundant material present on an internal surface of said through-going hole of the physical model of the set of the patient's teeth while inserting said dental implant analog by pulling via a pulling tool, thereby ensuring fit between said dental implant analog and said through-going hole of said physical model of a set of a patient's teeth.

2. A dental implant analog according to claim 1, wherein said proximal end comprises a second recess extending from the proximal end along the dental implant analog in the direction of the distal end.

3. A dental implant analog according to claim 2, wherein said second recess is a second anti-rotational recess being configured to engage with a complementary feature of the through-going hole of the physical model of the set of the patient's teeth so as to resist rotation of the dental implant analog and the second anti-rotational recess comprising a cutting edge configured to remove, by scraping, redundant material present on an internal surface of said through-going hole of the physical model of the set of the patient's teeth while inserting said dental implant analog by pulling via a pulling tool.

4. A dental implant analog according to claim 3, wherein said first anti-rotational recess lies across the internal bore from the second anti-rotational recess.

5. A dental implant analog according to claim 3, wherein said proximal end further comprises a third recess, said third recess extending from the proximal end along the dental implant analog in the direction of the distal end, and said third recess being configured to configured to engage with a complementary feature of the through-going hole of the physical model of the set of the patient's teeth.

6. A dental implant analog according to claim 2, wherein said second recess is a guiding recess configured to engage with a complementary feature of the through-going hole of the physical model of the set of the patient's teeth.

7. A dental implant analog according to claim 1, wherein said middle section comprises an annular lip (9) configured to, when in use, engage with one or more complementary protrusions (15) located in said through-going hole of a physical model of a set of a patient's teeth, thereby providing a snap-fit with said one or more complementary protrusions.

8. A dental implant analog according to claim 7, wherein said annular lip (9) comprises a circular lip surrounding said at least one internal bore having said internal thread along said longitudinal axis, and wherein said annular lip (9) comprises triangular shape elements having an inclined top engaging surface.

9. A dental implant analog according to claim 8, wherein said inclined top engaging surface engages with said one or more complementary protrusions located on said through-going hole of said physical model of a set of a patient's teeth, in a snap-fit fashion.

10. A dental implant analog according to claim 1, wherein said middle section comprises a cutting edge.

11. A dental implant analog according to claim 1, wherein said distal end comprises a cutting edge.

12. An implant analog kit (16) comprising:
said dental implant analog according to claim 1; and
an element having a first end (18, 22) and a second end (17, 21), wherein said first end has an external thread configured to engage with said internal thread of said at least one internal bore.

13. An implant analog kit according to claim 12, wherein said element is an elongated element having an engaging surface located onto said second end (17) adapted to engage with a pulling tool (19).

14. An implant analog kit according to claim 12, wherein said element is a screw (20) and wherein said second end (21) comprises an engaging surface adapted to mate with protuberance or recesses of a tightening tool.

15. The combination of a physical model of a set of a patient's teeth and a dental implant analog according to claim 1, said physical model of a set of a patient's teeth having a base face and an opposite gingival part and a through-going hole extending from said base face to said opposite gingival part, wherein said through-going hole comprises one or more recesses and/or protrusions engaging with complementary protrusions and/or recesses surrounding said at least one internal bore, wherein said one or more protrusions located on a through-going hole of a physical model of a set of a patient's teeth comprises one or more wedge elements, wherein said one or more protrusions located on a through-going hole of a physical model of a set of a patient's teeth are one or more indentations within an internal surface of said through-going hole.

16. The combination according to claim 15, wherein said one or more indentation are a groove within said internal surface of said through-going hole.

17. A method of positioning a dental implant analog into a physical model of a set of a patient's teeth using an implant analog kit that comprises (i) a dental implant analog according to claim 1 and (ii) an element having a first end (18, 22) and a second end (17, 21), wherein said first end has an external thread configured to engage with said internal thread of said at least one internal bore of the dental implant analog, said method comprising:
inserting said dental implant analog through a gingival face of a thorough-going hole extending from a base face to said opposite gingival face of said physical model of a set of a patient's teeth;
inserting said first end of said element through said base face of said thorough-going hole extending from said base face to said opposite gingival face;
engaging said external thread of said first end of said element with said internal thread of said at least one internal bore; and
pulling said dental implant analog into place until contact between an end surface of said element or a pulling tool and said first surface of said dental implant analog, thereby aligning said end surface and said bottom surface with said one or more surfaces of a physical model of patient's teeth surrounding said through-going hole.

* * * * *